(12) United States Patent
Aslam et al.

(10) Patent No.: US 12,401,048 B1
(45) Date of Patent: Aug. 26, 2025

(54) METAL-CARBON DIOXIDE ($CO_2$) BATTERY CELL

(71) Applicant: United Arab Emirates University, Al Ain (AE)

(72) Inventors: Muhammad Kashif Aslam, Al Ain (AE); Ali Al Marzouqi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/032,872

(22) Filed: Jan. 21, 2025

(51) Int. Cl.
*H01M 4/86* (2006.01)
*H01M 4/90* (2006.01)
*H01M 12/02* (2006.01)
*H01M 12/08* (2006.01)

(52) U.S. Cl.
CPC ....... *H01M 4/8657* (2013.01); *H01M 4/8605* (2013.01); *H01M 4/9008* (2013.01); *H01M 12/02* (2013.01); *H01M 12/08* (2013.01); *H01M 2300/0014* (2013.01)

(58) Field of Classification Search
None
See application file for complete search history.

(56) References Cited

U.S. PATENT DOCUMENTS

| 2024/0141517 A1* | 5/2024 | Cowan | H01M 4/8807 |
| 2024/0222744 A1* | 7/2024 | Valsecchi | H01M 4/42 |

FOREIGN PATENT DOCUMENTS

| WO | WO-2022129895 A1 * | 6/2022 | B01J 23/34 |
| WO | WO-2022238584 A1 * | 11/2022 | H01M 12/08 |
| WO | WO-2024086935 A1 * | 5/2024 | |

* cited by examiner

*Primary Examiner* — Tracy M Dove
(74) *Attorney, Agent, or Firm* — MH2 Technology Law Group, LLP

(57) ABSTRACT

The present disclosure is directed to a zero-gap flow-type metal-Carbon dioxide $CO_2$ battery cell. The battery cell includes an electrolyte chamber allowing flow of electrolyte and a metal electrode configured as anode, being accommodated in the electrolyte chamber and defined with a plurality of apertures. Further, the battery cell includes a $CO_2$ chamber allowing flow of $CO_2$ and a gas diffusion electrode (GDE) configured as cathode and accommodated in the $CO_2$ chamber. The GDE is defined with a first side and a second side, which is coated with catalyst layer. The catalyst layer abuts a membrane on the metal electrode such that, the electrolyte from the electrolyte chamber flows through the plurality of apertures, penetrates through the membrane and contacts the catalyst layer. Further, $CO_2$ from the $CO_2$ chamber contacts the second side of the gas diffusion electrode to diffuse through the catalyst and towards the metal electrode.

19 Claims, 7 Drawing Sheets

METAL-CARBON DIOXIDE (CO₂) BATTERY CELL

TECHNOLOGICAL FIELD

The present disclosure in general relates to the field of generation and distribution of electric power by batteries. The present disclosure is further directed towards a zero-gap flow-type metal-Carbon dioxide ($CO_2$) battery cell and a battery module thereof.

BACKGROUND

The information in this section merely provides background information related to the present disclosure and may not constitute prior art(s) for the present disclosure.

Emission of greenhouse gases is continuously increasing with industrialization and carbon dioxide [$CO_2$] amounts to one of the largest proportions of greenhouse gases. Considering this, various systems have evolved which utilize $CO_2$ to produce energy and high value hydrocarbons. On such system is Metal-$CO_2$ battery, which utilizes $CO_2$ for energy regeneration. In Metal-$CO_2$ batteries, a metal anode oxidizes and releases electrons, which are then transferred through an external circuit to a cathode to reduce $CO_2$. Conventional Metal-$CO_2$ batteries operate with non-aqueous electrolyte, which pose limitations such as poor rate capability, high voltage gap and short cycle life due to accumulation of solid discharge residue on surface of electrodes or catalyst of said battery. Further, in the conventional batteries, proton-coupled electron transfer (PCET) reaction is a challenge, due to non-aqueous electrolyte, which tends to inhibit reaction of $CO_2$ to hydrocarbons. In addition, structural configuration of the conventional Metal-$CO_2$ battery not only makes it bulky, but also increases ionic resistance during transport of ions between the metal anode and the cathode. This leads to slower ion transport, which in-turn tends to limit battery cell reaction kinetics, thus affecting performance of the Metal-$CO_2$ battery.

Present disclosure is directed to overcome one or more limitations stated above or any other limitations associated with the known arts.

General Description

One or more shortcomings of the prior art are overcome by a device and a system as claimed and additional advantages are provided through the present disclosure. Additional features and advantages are realized through the techniques of the present disclosure. Other embodiments, implementations and aspects of the disclosure are described in detail herein and are considered a part of the claimed disclosure.

A first aspect of the disclosure concerns a zero-gap flow-type metal-Carbon dioxide ($CO_2$) battery cell. The battery cell includes an electrolyte chamber configured to allow flow of electrolyte and a metal electrode configured as an anode, where the metal electrode is accommodated in the electrolyte chamber and is defined with a plurality of apertures. Further, the battery cell includes a Carbon dioxide ($CO_2$) chamber configured to allow flow of Carbon dioxide ($CO_2$) and a gas diffusion electrode (GDE) configured as a cathode, where the gas diffusion electrode (GDE) is accommodated in the Carbon dioxide ($CO_2$) chamber. The gas diffusion electrode (GDE) is defined with a first side and a second side, opposite to the first side, and the second side is coated with a catalyst layer. The catalyst layer abuts a membrane on the metal electrode such that, the electrolyte from the electrolyte chamber flows through the plurality of apertures in the metal electrode 105, penetrates through the membrane and contacts the catalyst layer. Further, Carbon dioxide ($CO_2$) from the Carbon dioxide ($CO_2$) chamber contacts the second side of the gas diffusion electrode to diffuse through the catalyst and towards the metal electrode.

According to a configuration of the first aspect, the gas diffusion electrode comprises an intermediate layer sandwiched between the first side of the gas diffusion electrode and the catalyst layer. The intermediate layer is formed using a mixture of Polytetrafluoroethylene (PTFE) and carbon nanospheres.

According to a configuration of the first aspect, the metal electrode is a Zinc electrode and the gas diffusion electrode is made of carbon paper.

According to a configuration of the first aspect, the electrolyte is 6M KOH+0.02M $Zn(CH_3COO)_2$) and the membrane is made of a glass fibre.

According to a configuration of the first aspect, the catalyst layer is formed of Bismuth metal-organic framework (Bi-MOF).

According to a configuration of the first aspect, the electrolyte chamber is defined with a first inlet and a first outlet. The electrolyte enters through the first inlet and discharges through the first outlet.

According to a configuration of the first aspect, the electrolyte chamber is defined with a first cavity along an inner periphery to define a flow path for the flow of the electrolyte from the first inlet and towards the first outlet.

According to a configuration of the first aspect, the battery module includes a first gasket surrounding the metal electrode and abutting to inner walls of the first cavity.

According to a configuration of the first aspect, the Carbon dioxide ($CO_2$) chamber is defined with a second inlet and a second outlet. Carbon dioxide ($CO_2$) enters through the second inlet and discharges through the second outlet.

According to a configuration of the first aspect, the Carbon dioxide ($CO_2$) chamber is defined with a second cavity along an inner periphery to define a flow path for the flow of Carbon dioxide ($CO_2$).

According to a configuration of the first aspect, the battery module includes a second gasket surrounding the gas diffusion electrode and abutting inner walls of the second cavity.

According to a configuration of the first aspect, the battery module includes at least one electric terminal extending from each of the metal electrode and the gas diffusion electrode to conduct electrons from the metal electrode towards the gas diffusion electrode.

A second aspect of the disclosure concerns a zero-gap flow-type metal-Carbon dioxide battery module. The battery module includes a plurality of zero-gap flow-type metal-Carbon dioxide battery cells stacked within the casing in a defined orientation. Each of the plurality of battery cells includes an electrolyte chamber configured to allow flow of electrolyte and a metal electrode configured as an anode, where the metal electrode is accommodated in the electrolyte chamber and is defined with a plurality of apertures. Further, the battery cell includes a Carbon dioxide ($CO_2$) chamber configured to allow flow of Carbon dioxide ($CO_2$) and a gas diffusion electrode (GDE) configured as a cathode, where the gas diffusion electrode (GDE) is accommodated in the Carbon dioxide ($CO_2$) chamber. The gas diffusion electrode (GDE) is defined with a first side and a second side, opposite to the first side, and the second side is coated with a catalyst layer. The catalyst layer abuts a membrane on the metal electrode such that, the electrolyte from the electrolyte chamber flows through the plurality of apertures in the metal electrode, penetrates through the membrane and contacts the catalyst layer. Further, Carbon dioxide ($CO_2$) from the Carbon dioxide ($CO_2$) chamber contacts the second side of the gas diffusion electrode to diffuse through the catalyst and towards the metal electrode.

According to a configuration of the second aspect, the battery module includes a pump adapted to circulate the electrolyte and Carbon dioxide to each of the plurality of zero-gap flow-type metal-Carbon dioxide battery cells stacked within the casing.

The foregoing description is illustrative only and is not intended to be in any way limiting. In addition to the illustrative aspects, embodiments 1 and features described above, further aspects, embodiments 1, and features will become apparent by reference to the drawings and the following description.

Embodiment 1

The present disclosure also encompasses embodiment 1 as defined in the following numbered phrases. It should be noted that these numbered embodiments 1 are intended to add to this disclosure and are not intended in any way to be limiting.

1. A zero-gap flow-type metal-Carbon dioxide ($CO_2$) battery cell, the battery cell comprising: an electrolyte chamber configured to allow flow of electrolyte; a metal electrode configured as an anode, the metal electrode is accommodated in the electrolyte chamber and is defined with a plurality of apertures; a Carbon dioxide ($CO_2$) chamber configured to allow flow of Carbon dioxide ($CO_2$); and a gas diffusion electrode (GDE) configured as a cathode, the gas diffusion electrode (GDE) is accommodated in the Carbon dioxide ($CO_2$) chamber, the gas diffusion electrode (GDE) is defined with a first side and a second side, opposite to the first side, and the second side is coated with a catalyst layer, wherein, the catalyst layer abuts a membrane on the metal electrode such that, the electrolyte from the electrolyte chamber flows through the plurality of apertures in the metal electrode, penetrates through the membrane and contacts the catalyst later, and Carbon dioxide ($CO_2$) from the Carbon dioxide ($CO_2$) chamber contacts the second side of the gas diffusion electrode to diffuse through the catalyst and towards the metal electrode.
2. The battery cell of embodiment 1, wherein the gas diffusion electrode comprises an intermediate layer sandwiched between the first side of the gas diffusion electrode and the catalyst layer, wherein the layer is formed using a mixture of Polytetrafluoroethylene (PTFE) and carbon nanospheres.
3. The battery cell 100 of embodiment 1, wherein the metal electrode is a Zinc electrode.
4. The battery cell of embodiment 1, wherein the gas diffusion electrode is made of carbon paper.
5. The battery cell of embodiment 1, wherein the electrolyte is 6M KOH+0.02M $Zn(CH_3COO)_2$).
6. The battery cell of embodiment 1, wherein the membrane is made of a glass fibre.
7. The battery cell of embodiment 1, wherein the catalyst layer is formed of Bismuth metal-organic framework (Bi-MOF).
8. The battery cell of embodiment 1, wherein the electrolyte chamber is defined with a first inlet and a first outlet, wherein the electrolyte enters through the first inlet and discharges through the first outlet.
9. The battery cell of embodiments 1 and 8, wherein the electrolyte chamber is defined with a first cavity along an inner periphery to define a flow path for the flow of the electrolyte from the first inlet and towards the first outlet.
10. The battery cell of embodiments 1 and 9, comprising a first gasket surrounding the metal electrode and abutting to inner walls of the first cavity.
11. The battery cell of embodiment 1, wherein the Carbon dioxide ($CO_2$) chamber is defined with a second inlet and a second outlet, wherein Carbon dioxide ($CO_2$) enters through the second inlet and discharges through the second outlet.
12. The battery cell of embodiment 1, wherein the Carbon dioxide ($CO_2$) chamber is defined with a second cavity along an inner periphery to define a flow path for the flow of Carbon dioxide ($CO_2$).
13. The battery cell of embodiment 1 and 12, comprising a second gasket surrounding the gas diffusion electrode and abutting inner walls of the second cavity.
14. The battery cell of embodiment 1, comprising at least one electric terminal extending from each of the metal electrode and the gas diffusion electrode to conduct electrons from the metal electrode towards the gas diffusion electrode.
15. A zero-gap flow-type metal-Carbon dioxide battery module, the module comprising: a casing; and a plurality of zero-gap flow-type metal-Carbon dioxide battery cells stacked within the casing in a defined orientation, each of the plurality of zero-gap flow-type metal-Carbon dioxide cells comprises: an electrolyte chamber configured to allow flow of electrolyte; a metal electrode configured as an anode, the metal electrode is accommodated in the electrolyte chamber and is defined with a plurality of apertures; a Carbon dioxide ($CO_2$) chamber configured to allow flow of Carbon dioxide ($CO_2$); and a gas diffusion electrode (GDE) configured as a cathode, the gas diffusion electrode (GDE) is accommodated in the Carbon dioxide ($CO_2$) chamber, the gas diffusion electrode (GDE) is defined with a first side and a second side, opposite to the first side, and the second side is coated with a catalyst layer, wherein, the catalyst layer abuts a membrane on the metal electrode such that, the electrolyte from the electrolyte chamber flows through the plurality of apertures in the metal electrode, penetrates through the membrane and contacts the catalyst later, and Carbon dioxide ($CO_2$) from the Carbon dioxide ($CO_2$) chamber contacts the second side of the gas diffusion electrode to diffuse through the catalyst and towards the metal electrode.
16. The battery module of embodiment 15, comprising a pump adapted to circulate the electrolyte and Carbon dioxide to each of the plurality of zero-gap flow-type metal-Carbon dioxide battery cells stacked within the casing.

BRIEF DESCRIPTION OF DRAWINGS

In order to better understand the subject matter that is disclosed herein and to exemplify how it may be carried out in practice, embodiments 1 will now be described, by way of non-limiting examples only, with reference to the accompanying drawings, in which.

DETAILED DESCRIPTION

Figure 1:
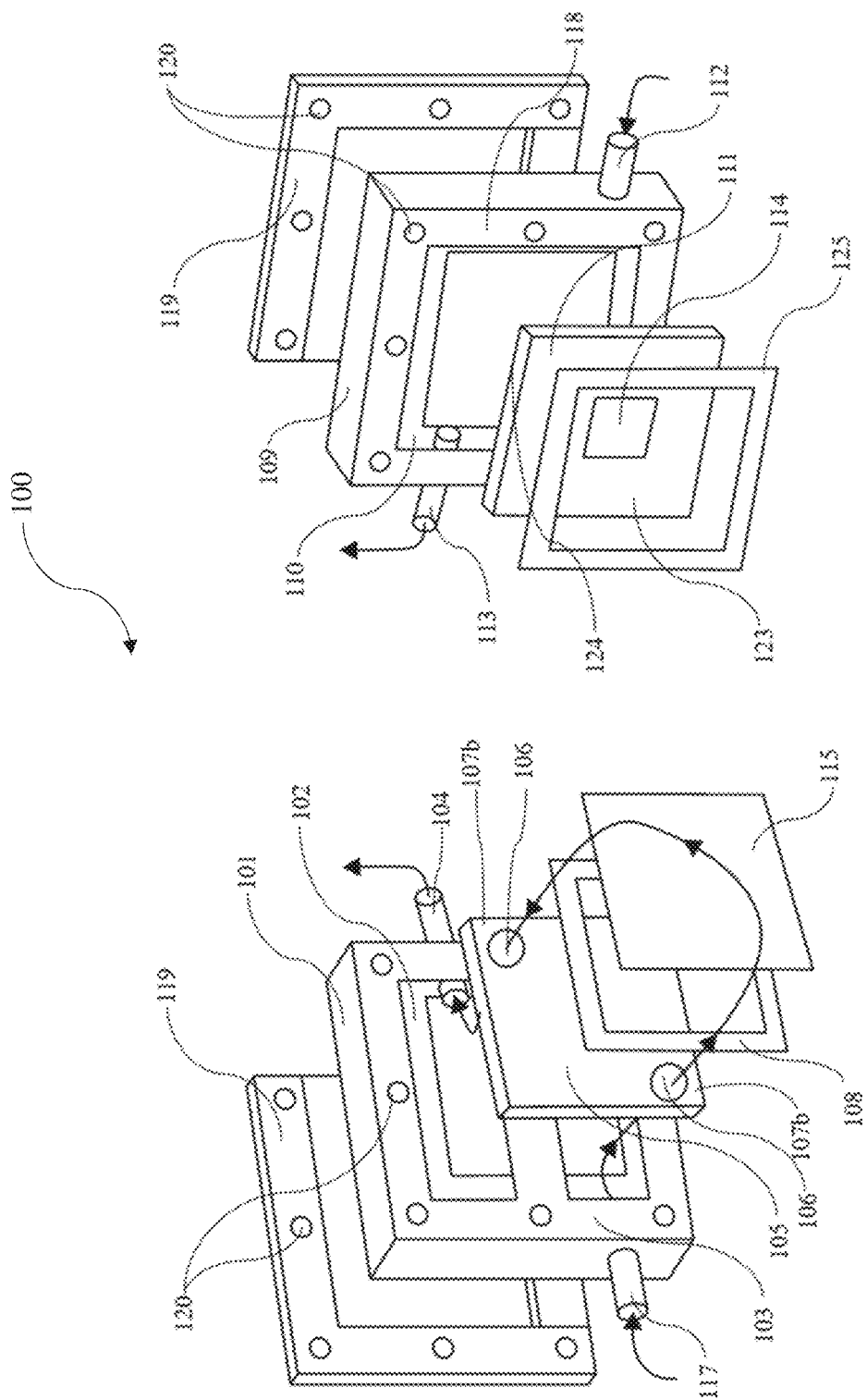
FIG. 1 illustrates an explode view of a zero-gap flow-type metal-Carbon dioxide ($CO_2$) battery cell, according to an example of the present disclosure.
Figure 6:
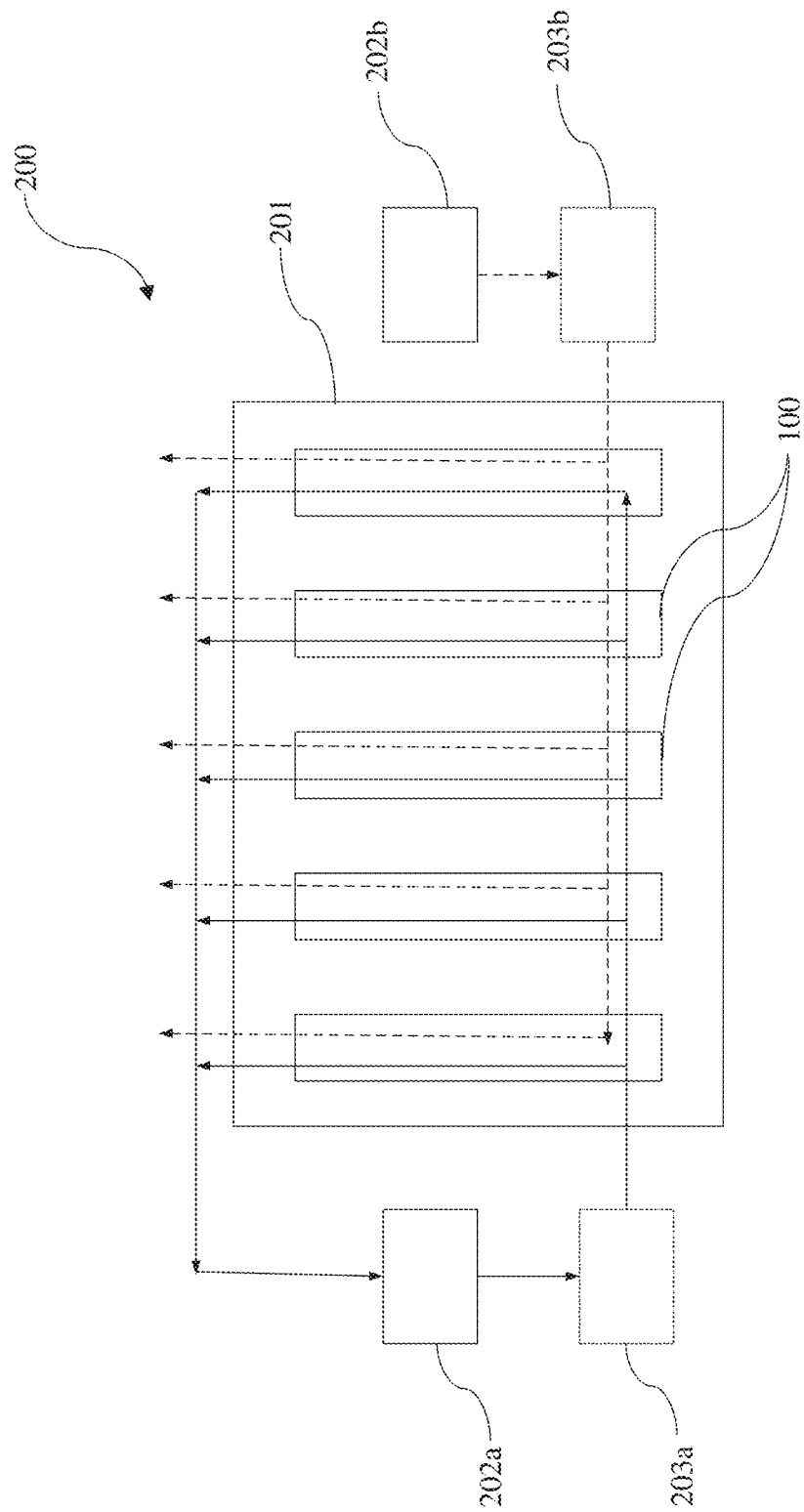
FIG. 6 illustrates a schematic view of a zero-gap flow-type metal-Carbon dioxide ($CO_2$) battery module, according to an example of the present disclosure.

FIG. 1 illustrates an exploded view of a zero-gap flow-type metal-Carbon dioxide ($CO_2$) battery cell 100 [hereinafter interchangeably referred as battery cell 100], in accordance with an exemplary implementation of the present disclosure. The term 'flow-type" as used in the present disclosure refers to a feature of the battery cell 100 where, working fluids such as electrolyte and/or Carbon dioxide [hereinafter interchangeably referred as $CO_2$] are continuously circulated into the battery cell 100 to generate, convert and/or distribute energy, and other byproducts. In an implementation, a plurality of battery cells 100 may be stacked in a defined orientation to form a zero-gap flow-type metal-Carbon dioxide ($CO_2$) battery module 200 [hereinafter referred interchangeably as battery module 200]. As seen in FIG. 6, the battery module 200 includes a casing 201 inside which a plurality of battery cells 100 are stacked in the defined orientation. As an example, the defined orientation may be one of a vertical orientation or a horizontal orientation. The battery module 200 includes one or more reservoirs 202a, 202b for storing the working fluids and one or more pumps 203a, 203b associated with each of the one or more reservoirs 202a, 202b, respectively. The one or more pumps 203a, 203b are configured for circulating the working fluids into each of the plurality of battery modules 100 to facilitate operation of each of the plurality of battery modules 100 to generate energy and other by-products such as hydrocarbons. As an example, the one or more pumps 203a, 203b may be but not limiting to a peristaltic pump. In an illustrated embodiment, as seen in FIG. 6, one reservoir 202a is adapted to store the electrolyte and the pump 203a is configured to circulate the electrolyte into each of the plurality of battery modules and likewise, one reservoir 202b is adapted to store $CO_2$ and the pump 203b is configured to circulate the $CO_2$ into each of the plurality of battery modules 100. However, the same cannot be construed as a limitation, as individual reservoir may be associated with each of the battery modules 100 for supplying electrolyte and $CO_2$ into the battery modules 100. Referring to FIG. 1, the battery cell 100 includes an electrolyte chamber 101 which is configured to allow flow of electrolyte. In an implementation, the electrolyte chamber 101 may be defined in any geometrical shape such as not limiting to square, rectangle and the like, depending on configuration of the battery cell 100 and its intended application. The electrolyte chamber 101 may be defined with a first cavity 102 on an inner surface 103, i.e., the inner surface 103 is a surface of the electrolyte chamber 101 which is not exposed to surroundings of the battery cell 100 or to adjacent battery cell 100 in the battery module 200, while an outer surface, opposite to the inner surface 103 of the electrolyte chamber 101 may be covered or selectively exposed to the surrounding or the adjacent battery cell 100 of the battery module 200. In an implementation, the first cavity 102 extends proximal to a periphery and at a distance from sides of the electrolyte chamber 101. The first cavity 102 may define a flow path for flow of the electrolyte during operation of the battery cell 100. Further, the electrolyte chamber 101 is defined with a first inlet 117 and a first outlet 104. The first inlet 117 may be defined proximal to a bottom end at one side of the electrolyte chamber 101 and the first outlet 104 may be defined proximal to a top end at another side, opposite to one side of the electrolyte chamber 101. The electrolyte enters through the first inlet 117, flows through the flow path and discharges out of the electrolyte chamber 101 through the first outlet 104. As an example, the electrolyte may be including, but not limiting to, an aqueous 6M KOH+0.02M $Zn(CH_3COO)_2$).

Further referring to FIG. 1, the battery cell 100 includes a metal electrode 105 which is configured to act as an anode. As an example, the metal electrode 105 may be including, but not limiting to, a Zinc electrode. The metal electrode 105 is accommodated in the electrolyte chamber 101 and is defined with a plurality of apertures 106. In an implementation, one aperture of the plurality of apertures 106 is defined in proximity to one corner 107a of the metal electrode 105, and other aperture of the plurality of apertures 106 is defined in proximity to other corner 107b which is diagonally opposite to the one corner 107a of the metal electrode 105. In an implementation, the metal electrode 105 is accommodated in the electrolyte chamber 101 where the metal electrode 105 covers the first cavity 102 such that, the electrolyte entering the first inlet 117 of the electrolyte chamber 101 flows through the first flow path and through the plurality of apertures 106 and discharges through the first outlet 104. The plurality of apertures 106 enables effective electrolyte penetration through the metal electrode 105, thus enhances overall reaction kinetics. In an implementation, the battery cell 100 includes a first gasket 108 which is positioned to surround the metal electrode 105 and abut a portion of the inner surface 103 of the electrolyte chamber 101. The first gasket 108 forms a sealing between the metal electrode 105 and the first cavity 102 [i.e., the electrolyte chamber 101], forming a leak proof flow path for the electrolyte.

Further, the battery cell 100 includes a Carbon dioxide ($CO_2$) chamber 109 which is configured to allow flow of Carbon dioxide ($CO_2$). In an implementation, the Carbon dioxide ($CO_2$) chamber 109 may be defined in any geometrical shape such as not limiting to square, rectangle and the like depending on the configuration of the battery cell 100, and complements to shape of the electrolyte chamber 101. The Carbon dioxide ($CO_2$) chamber 109 may be defined with a second cavity 110 on an inner surface 118, i.e., the inner surface 118 is a surface of the Carbon dioxide ($CO_2$) chamber 109 which is not exposed to surroundings of the battery cell 100 or to adjacent battery cell 100 in the battery module 200, while an outer surface, opposite to the inner surface 118 of the Carbon dioxide ($CO_2$) chamber 109 may be covered or selectively exposed to the surrounding or the adjacent battery cell 100 of the battery module 200. In an implementation, the second cavity 110 extends along a periphery and at a distance from sides of the Carbon dioxide ($CO_2$) chamber 109. The second cavity 110 may define a flow path for flow of $CO_2$ during operation of the battery cell 100. Further, the Carbon dioxide ($CO_2$) chamber 109 is defined with a second inlet 112 and a second outlet 113. The second inlet 112 may be defined in proximity to a bottom end at one side of the Carbon dioxide ($CO_2$) chamber 109 and the second outlet 113 may be defined in proximity to a top end at another side, opposite to one side. The Carbon dioxide ($CO_2$) enters through the second inlet 112, flows through the flow path and discharges out of the Carbon dioxide ($CO_2$) chamber 109, through the second outlet 113. In an implementation, the battery cell 100 includes a first gasket 108 which is positioned to surround the metal electrode 105 and abut a portion of the inner surface 103 of the electrolyte chamber 101. The first gasket 108 forms a sealing between the metal electrode 105 and the first cavity 102 [i.e., the electrolyte chamber 101], forming a leak proof flow path for the electrolyte.

Figure 2:
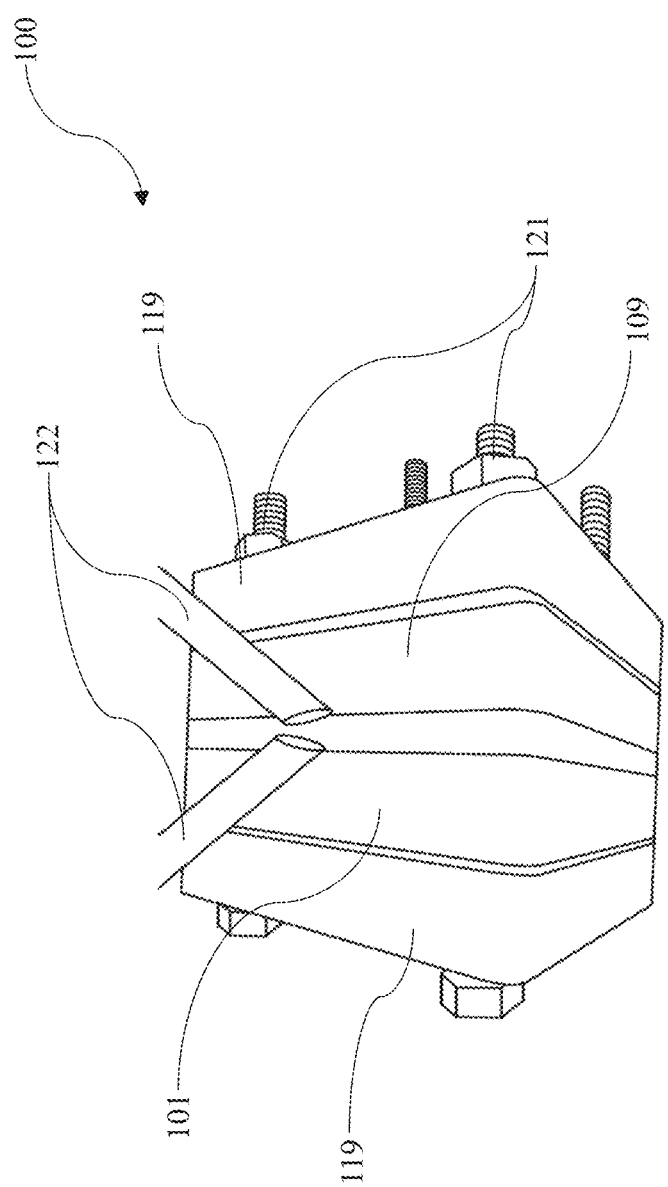
FIG. 2 illustrates an assembled perspective view of the zero-gap flow-type metal-Carbon dioxide ($CO_2$) battery cell of FIG. 1.
Figure 3:
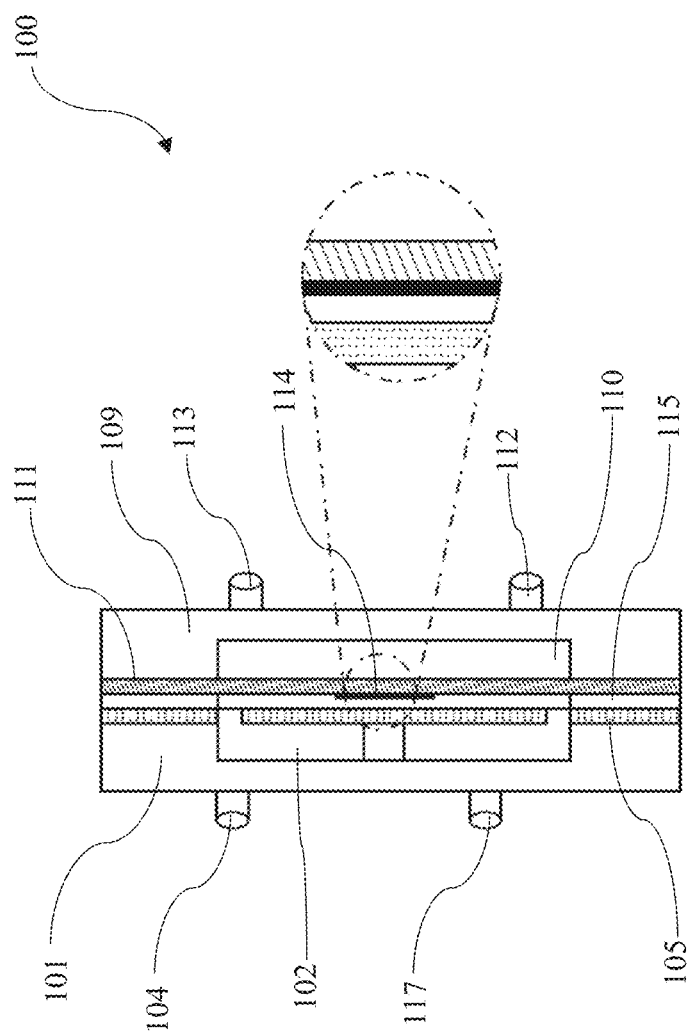
FIG. 3 illustrates a top sectional view of the zero-gap flow-type metal-Carbon dioxide ($CO_2$) battery cell of FIG. 2.

Referring again to FIG. 1, the battery cell 100 includes a gas diffusion electrode 111 which may be configured to act as a cathode and is accommodated in the Carbon dioxide ($CO_2$) chamber 109. As an example, the gas diffusion electrode 111 (GDE) is made of material including, but not limiting to, a carbon paper. The gas diffusion electrode 111 (GDE) is defined with a first side 123 and a second side 124, which is opposite to the first side 123. The second side 124 is coated with a catalyst layer 114, while the first side 123 may be configured to seat within the Carbon dioxide ($CO_2$) chamber 109. As an example, the catalyst layer 114 may be formed of material including, but not limiting to, Bismuth metal-organic framework (Bi-MOF). The catalyst layer 114 [i.e., of the gas diffusion electrode 111] and the metal electrode 105 are abutted to each other with no gap therebetween, thus forming zero-gap configuration [best seen in FIGS. 2 and 3]. In other words, configuration of the battery cell 100 having the electrolyte chamber 101 supporting the metal electrode 105 and the $CO_2$ chamber 109 accommodating the gas diffusion electrode 111 aids in forming zero-gap when the metal electrode 105 and the gas diffusion electrode 111 abut to each other. The zero-gap configuration of the battery cell 100 minimizes ionic resistance by reducing distance that the ions is required to travel between the metal electrode 105 and the gas diffusion electrode 111. Such configuration between the metal electrode 105 and the gas diffusion electrode 111 leads to faster ion transport and improves battery cell 100 reaction kinetics, thus results in improving performance of the battery cell 100. Further, the electrochemical reaction at the metal electrode 105 and the gas diffusion electrode 111 occur efficiently as there is minimal loss of ionic conductivity, thus aids in achieving current density of greater than 120 mA cm 2. In addition, ohmic losses caused due to resistance caused by the electrolyte is reduced, which contributes to power density greater than 40 mW cm 2 and open-circuit potential of 1.73 V of the battery cell 100. Furthermore, the zero-gap configuration makes the battery cell 100 compact and lightweight. In an implementation, the battery cell 100 includes a second gasket 125 which is positioned to surround the gas diffusion electrode 111 and abut a portion of the inner surface 103 of the $CO_2$ chamber 109. The second gasket 125 forms a sealing between the gas diffusion electrode 111 and the second cavity 110 [i.e., the $CO_2$ chamber 101], forming a leak proof flow path for $CO_2$.

In an implementation, as seen in FIG. 1, the battery cell 100 may include a membrane 115 made of material including, but not limiting to, a glass fibre. The membrane 115 may be positioned on the metal electrode 105 or on the second side 124 [thus, the catalyst layer 114] of the gas diffusion electrode 111, such that, the membrane 115 is sandwiched between the metal electrode 105 and the second side 124 of the gas diffusion electrode 111. The membrane 115 prevents direct contact of the metal electrode 105 and the gas diffusion electrode 111, and maintains electric neutrality by allowing ionic movement between metal electrode 105 and the gas diffusion electrode 111. The membrane 115 facilitates flow of the electrolyte from the metal electrode 105 and ensures uniform electrolyte distribution between the metal electrode 105 and the first side 123 of the gas diffusion electrode 111. In addition, the membrane 115 aids in preventing contamination of the catalyst layer 114 by ZnO formed during operation of the battery cell 100.

Figure 4:
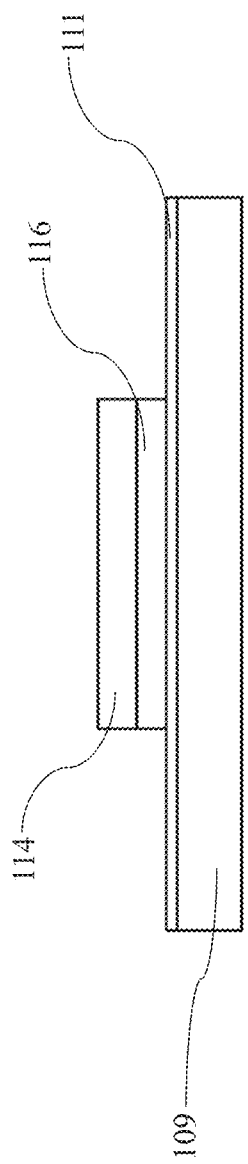
FIG. 4 illustrates a side view of a gas diffusion electrode, according to an example of the present disclosure.

In an implementation, as seen in FIG. 4, the gas diffusion electrode 111 may include an intermediate layer 116 which is sandwiched between the second side 124 of the gas diffusion electrode 111 (GDE) and the catalyst layer 114. As an example, the intermediate layer 116 may be formed using but not limiting to a mixture of Polytetrafluoroethylene (PTFE) and carbon nanospheres. The intermediate layer 116 acts as a hydrophobic, water-repellent layer and creates localized $CO_2$ environment. This prevents absorption of $CO_2$ by the electrolyte at the first side 123 of the gas diffusion electrode 111 (GDE), thus mitigating crystallization on the first side 123. Mitigating crystallization allows diffusion of $CO_2$ from the $CO_2$ chamber 109 towards the catalyst layer 114 through the first side 123 of the gas diffusion electrode 111 (GDE), thus resulting in efficient $CO_2$ conversion during operation of the battery cell 100.

Referring again to FIGS. 1 and 2, the battery cell 100 may include at least one shell 119 coupled to each of the electrolyte chamber 101 and the $CO_2$ chamber 109. The at least one shell 119 aids in mechanically connecting all the components of the battery cell 100 and keeps the battery cell 100 intact. In an implementation, the at least one shell 119, the electrolyte chamber 101 and the $CO_2$ chamber 109 are defined with a plurality of openings 120 to receive one or more connecting elements 121 for securing the at least one shell 119 at each of the electrolyte chamber 101 and the $CO_2$ chamber 109 with each other, which in turn secures the components of the battery cell 100. As an example, the one or more connecting elements 121 may be but not limiting to bolt-nut arrangement, screws and the like. The one or more connecting elements 121 aids in easy assembling and disassembling of the battery cell 100, thus aiding easy serviceability. Further, the battery cell 100 includes at least one electric terminal 122 extending from each of the metal electrode 105 and the gas diffusion electrode 111 for conducting electrons from the metal electrode 105 towards the gas diffusion electrode 111.

Figure 5:
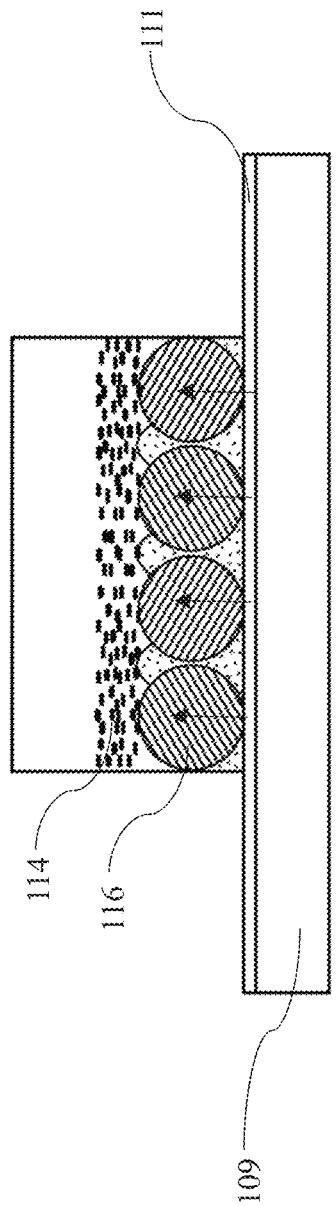
FIG. 5 illustrates a schematic sectional view of a portion of the battery cell, depicting diffusion of $CO_2$ from the $CO_2$ chamber, according to an example of the present disclosure.

In an operational implementation of the battery cell 100 to generate, convert and/or distribute energy, initially $CO_2$ may be allowed to flow into the $CO_2$ chamber 109 through the second inlet 112, and the electrolyte may be allowed to flow into the electrolyte chamber 101 through the first inlet 117. As seen in FIG. 5, the $CO_2$ flowing through the $CO_2$ chamber 109 diffuses through the first side 123 of gas diffusion electrode 111 (GDE) towards the second side 124 of the gas diffusion electrode 111 (GDE), and then exits through the second outlet 113 along with other gases formed during reaction at the gas diffusion electrode 111 (GDE). Subsequently, as best seen in FIG. 1 [indicated by arrow line], the electrolyte flowing through the electrolyte chamber 101 passes through one aperture of the plurality of apertures 106 and penetrates through the membrane 115. The membrane 115 aids uniform electrolyte distribution between the metal electrode 105 and the second side 123 of the gas diffusion electrode 111, and then flows through other aperture of the plurality of apertures 106 and exits the electrolyte chamber 101 through the first outlet 104, along with liquid products formed during the reaction.

When $CO_2$ flows through the $CO_2$ chamber 109, a chemical reaction of $CO_2$ occurs at the gas diffusion electrode 111 (thus, cathode) as shown in equation (i), below:

$$CO_2+2H_2O+2e \rightarrow HCOO+OH \quad \text{(i)}$$

That is, at the cathode, the $CO_2$ supplied to the $CO_2$ chamber 109 is subjected to chemical reaction with $H_2O$ in the electrolyte which is allowed to flow through the electrolyte chamber 101 and produce formate and hydroxide ions.

Further, at the metal electrode 105 [Zn electrode], Zn is oxidized to form zinc ions ($Zn^{2+}$), releasing electrons, as shown in equation (ii), below. Oxidation of Zn occurs electrochemically and is a spontaneous reaction driven by the thermodynamics of the system and the electrochemical potential difference established during the battery's operation.

$$Zn \rightarrow Zn^{2+}2e^- \quad \text{(ii)}$$

Therefore, the reaction scheme of the overall reaction occurring in a reaction process during operation of the battery cell 100 is as shown in equation (iii), below $$Zn+CO_2+2H_2O \rightarrow Zn(OH)_2+HCOO \quad \text{(iii)}$$

In addition to above, additional chemical reactions occur in the electrolyte, where Hydroxide is formed as shown in equation (iv) and precipitation of zinc hydroxide occurs as shown in equation (v), as below $$H_2O+e^- \rightarrow OH^- + 12H_2 \quad \text{(iv)}$$

$$Zn^{2+}2OH^- \rightarrow Zn(OH)_2 \quad \text{(v)}$$

In conclusion and as depicted in the above chemical reactions, $CO_2$ flows through the gas diffusion electrode 111 $CO_2$ reacts with protons (H) and electrons (e) to form various products based on the catalyst selectivity, such as CO, formate (HCOO), methane ($CH_4$), or ethylene ($C_2H_4$). Concurrently in alkaline conditions, hydroxide ions (OH) are formed at the gas diffusion electrode 111. The generated hydroxide ions (OH) migrate through the electrolyte toward the metal electrode 105. At the metal electrode 105 (i.e., Anode side) zinc (Zn) is oxidized by reacting with hydroxide ions (OH), forming zinc hydroxide ($Zn(OH)_2$) and releasing electrons (e). Zinc hydroxide ($Zn(OH)_2$) further decomposes into zinc oxide (ZnO) and water. The ZnO deposits on the metal electrode 105. The electrons released during the zinc oxidation reaction at the metal electrode 105 flow through the external circuit (load), generating an electric current that powers the connected external load. The electrons then return to the gas diffusion electrode 111, completing the circuit and allowing the chain of reactions to continue.

It should be noted that, the chemical reaction occurred at the gas diffusion electrode 111, the metal electrode 105 and additional reactions depends on metal type of the metal electrode 105, catalyst material, electrolyte composition and battery cell 100 operating conditions, and the same should not be construed as an operating limitation of the battery cell 100 of the present disclosure. As an example, if Copper-based catalysts are used in the battery cell, hydrocarbons such as $CH_4$, $C_2H_4$ is obtained. While other catalysts lead to formation of CO, HCOO, or $CH_3OH$, which may be subjected to secondary processes to obtain hydrocarbons.

Example

The zero-gap flow type metal-$CO_2$ battery cell of the present disclosure was subjected to open-circuit potential (OCP) examination under continuous supply of $CO_2$. Polarization curves were obtained for charging and discharging cycles of the zero-gap flow-type metal-$CO_2$ battery cell. Electrolyte flow rate was maintained at 10 mL min$^{-1}$ and $CO_2$ gas was introduced at a flow rate of 40 sccm (standard cubic centimeters per minute). Polarization curves obtained have been depicted in FIGS. 7a to 7c.

Figure 7A:
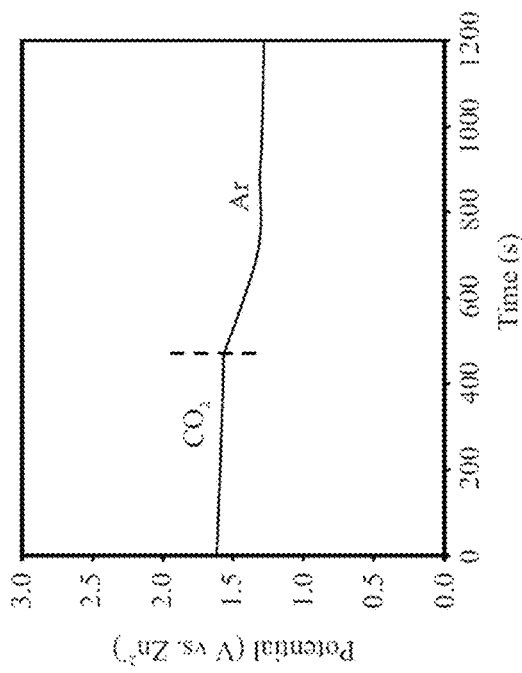
FIG. 7a-7c depicts polarization curves obtained during operation of the battery cell, according to an example of the present disclosure.
Figure 7B:
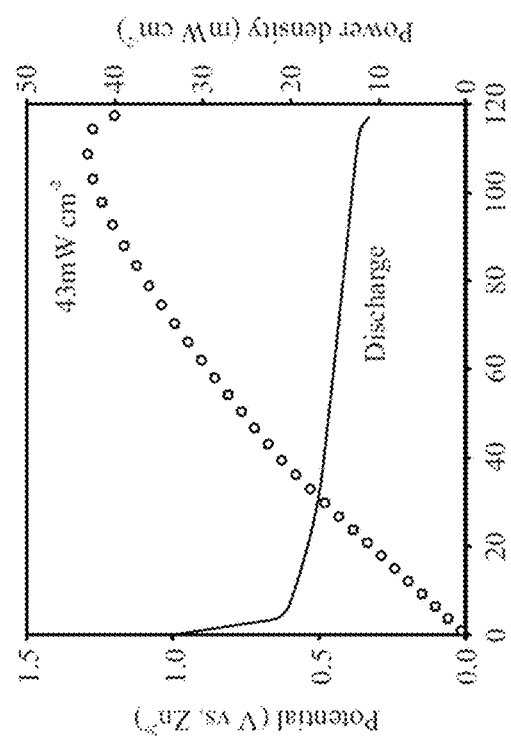

From FIG. 7a, when the atmosphere was switched to Argon, OCP fluctuations were observed, indicating the $CO_2$ reduction capability of the zero-gap flow-type metal-$CO_2$ battery cell battery cell. Further, FIG. 7b depicts the discharge and charge polarization curves, along with the corresponding power density curve. These curves demonstrate a power density of 43 mW cm"2 and a current density of 120 mA cm"2-values significantly higher than those reported for conventional Zn—$CO_2$ batteries (<7 mW cm"2 and <15 mA cm"2).

Figure 7C:
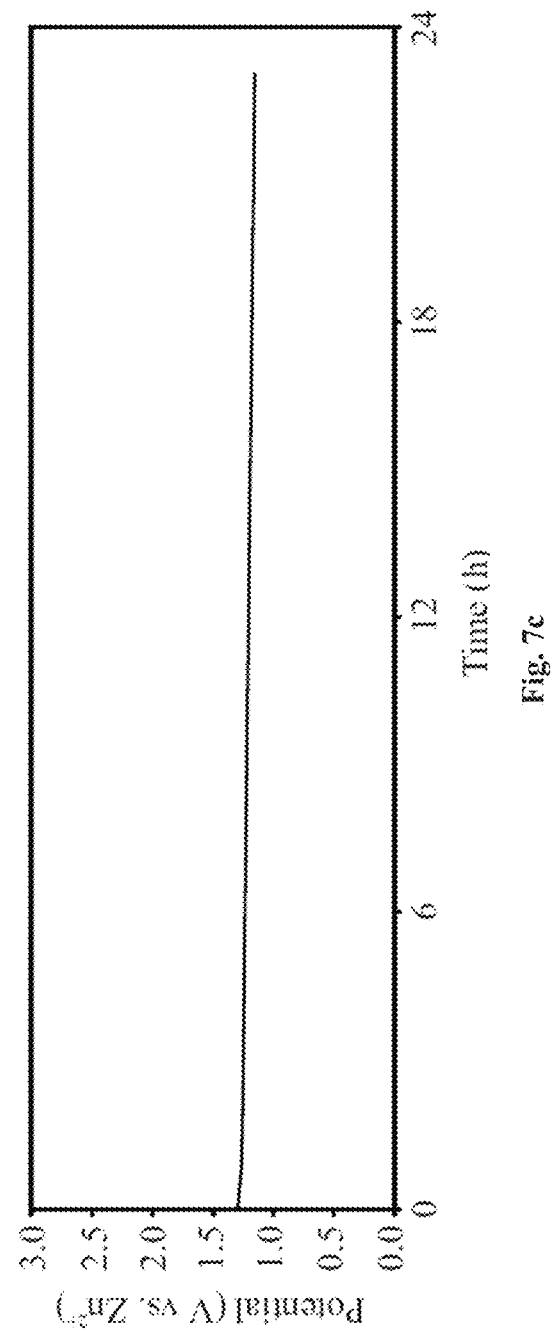

To assess long-term stability, the battery was subjected to continuous discharge for 23 hours at a constant current rate of 0.35 mA cm"2, as depicted in FIG. 7c. During this period, the battery displayed excellent stability, maintaining a high discharge voltage of 1.3 V, with only a minimal voltage decrease over the 23-hour discharge.

Additionally, the zero-gap flow-type metal-$CO_2$ battery cell exhibited high performance, particularly during the discharge process, achieving a faradaic efficiency (FE) of 96.3% for formate (HCOO$^-$) production. This high FE underscores the battery's strong capability to efficiently convert $CO_2$ into electricity and valuable chemical products. These results highlight the potential of the zero-gap flow-type metal-$CO_2$ battery cell as a stable and efficient energy conversion system for $CO_2$ utilization. It should be imperative that the device, the system, and any other elements described in the above description should not be considered as a limitation with respect to the figures. Rather, variations to such devices, systems and methods should be considered within the scope of the description.

The invention claimed is:

1. A metal-Carbon dioxide ($CO_2$) battery cell, the battery cell comprising:
   an electrolyte chamber configured to allow flow of electrolyte;
   a metal electrode configured as an anode, the metal electrode is accommodated in the electrolyte chamber and is defined with a plurality of apertures;
   a Carbon dioxide ($CO_2$) chamber configured to allow flow of Carbon dioxide ($CO_2$); and
   a gas diffusion electrode (GDE) configured as a cathode, the gas diffusion electrode (GDE) is accommodated in the Carbon dioxide ($CO_2$) chamber, the gas diffusion electrode (GDE) is defined with a first side and a second side, opposite to the first side, and the second side is coated with a catalyst layer,
   wherein, the catalyst layer abuts a membrane on the metal electrode such that, the electrolyte from the electrolyte chamber flows through the plurality of apertures in the metal electrode, penetrates through the membrane and contacts the catalyst layer, and Carbon dioxide ($CO_2$) from the Carbon dioxide ($CO_2$) chamber contacts the second side of the gas diffusion electrode to diffuse through the catalyst layer towards the metal electrode, and wherein the membrane is made of a glass fibre.

2. The battery cell according to claim 1, wherein the gas diffusion electrode comprises an intermediate layer sandwiched between the first side of the gas diffusion electrode and the catalyst layer, wherein the catalyst layer is formed using a mixture of Polytetrafluoroethylene (PTFE) and carbon nanospheres.

3. The battery cell according to claim 1, wherein the metal electrode is a Zinc electrode.

4. The battery cell according to claim 1, wherein the gas diffusion electrode is made of carbon paper.

5. The battery cell according to claim 1, wherein the electrolyte is 6M KOH+0.02M $Zn(CH_3COO)_2$).

6. The battery cell according to claim 1, wherein the catalyst layer is formed of Bismuth metal-organic framework (Bi-MOF).

7. The battery cell according to claim 1, wherein the electrolyte chamber is defined with a first inlet and a first outlet, wherein the electrolyte enters through the first inlet and discharges through the first outlet.

8. The battery cell according to claim 1, wherein the electrolyte chamber is defined with a first cavity on an inner surface and extends along a periphery at a distance from sides of the electrolyte chamber.

9. The battery cell according to claim 8, comprising a first gasket surrounding the metal electrode and abutting to inner walls of the first cavity.

10. The battery cell according to claim 1, wherein the Carbon dioxide ($CO_2$) chamber is defined with a second inlet and a second outlet, wherein Carbon dioxide ($CO_2$) enters through the second inlet and discharges through the second outlet.

11. The battery cell according to claim 1, wherein the Carbon dioxide ($CO_2$) chamber is defined with a second cavity on an inner surface and extends along a periphery at a distance from sides of the Carbon dioxide ($CO_2$) chamber.

12. The battery cell according to claim 11, comprising a second gasket surrounding the gas diffusion electrode and abutting inner walls of the second cavity.

13. The battery cell according to claim 1, comprising at least one electric terminal extending from each of the metal electrode and the gas diffusion electrode to conduct electrons from the metal electrode towards the gas diffusion electrode.

14. A metal-Carbon dioxide battery module, the module comprising:

a casing; and
a plurality of metal-Carbon dioxide battery cells stacked within the casing in a defined orientation, each of the plurality of metal-Carbon dioxide battery cells comprises:
an electrolyte chamber configured to allow flow of electrolyte;
a metal electrode configured as an anode, the metal electrode is accommodated in the electrolyte chamber and is defined with a plurality of apertures;
a Carbon dioxide ($CO_2$) chamber configured to allow flow of Carbon dioxide ($CO_2$); and
a gas diffusion electrode (GDE) configured as a cathode, the gas diffusion electrode (GDE) is accommodated in the Carbon dioxide ($CO_2$) chamber, the gas diffusion electrode (GDE) is defined with a first side and a second side, opposite to the first side, and the second side is coated with a catalyst layer,
wherein, the catalyst layer abuts a membrane on the metal electrode such that, the electrolyte from the electrolyte chamber flowing through the plurality of apertures in the metal electrode penetrates through the membrane and contacts the catalyst layer, and Carbon dioxide ($CO_2$) from the Carbon dioxide ($CO_2$) chamber contacts the second side of the gas diffusion electrode to diffuse through the catalyst layer towards the metal electrode, and wherein the membrane is made of a glass fibre.

15. The battery module according to claim 14, comprising a pump adapted to circulate the electrolyte and Carbon dioxide to each of the plurality of metal-Carbon dioxide battery cells stacked within the casing.

16. The battery cell according to claim 7, wherein the electrolyte chamber is defined with a first cavity on an inner surface and extends along a periphery at a distance from sides of the electrolyte chamber.

17. The battery cell according to claim 8, comprising a first gasket surrounding the metal electrode and abutting to inner walls of the first cavity.

18. The battery cell according to claim 16, comprising a first gasket surrounding the metal electrode and abutting to inner walls of the first cavity.

19. The battery cell according to claim 11, comprising a second gasket surrounding the gas diffusion electrode and abutting inner walls of the second cavity.

* * * * *